United States Patent [19]
Tabuchi et al.

[11] Patent Number: 5,642,560
[45] Date of Patent: Jul. 1, 1997

[54] METHOD OF MANUFACTURING AN ELECTROMAGNETIC CLUTCH

[75] Inventors: Yasuo Tabuchi, Anjo; Junichi Ohguchi, Toyoake; Masashi Tobayama, Ohbu, all of Japan

[73] Assignee: Nippondenso Co., Ltd., Kariya, Japan

[21] Appl. No.: 542,966

[22] Filed: Oct. 13, 1995

[30] Foreign Application Priority Data

Oct. 14, 1994 [JP] Japan .................................. 6-249139

[51] Int. Cl.$^6$ ................................................. H01F 41/02
[52] U.S. Cl. ................................................. 29/607; 192/84.1
[58] Field of Search ................................. 29/607, 602.1; 192/84 C

[56] References Cited

U.S. PATENT DOCUMENTS 2,860,403  11/1958  Meyer .......................... 29/607
4,669,295  6/1987  Koitabashi .

FOREIGN PATENT DOCUMENTS 57-43768  9/1982  Japan .

*Primary Examiner*—Carl E. Hall
*Attorney, Agent, or Firm*—Cushman, Darby & Cushman IP Group of Pillsbury Madison & Sutro LLP

[57] ABSTRACT

A first body is formed from a first cylindrical member. The first body includes a restricted portion which extends circumferentially along the first body and has an inner diameter smaller than that of the first cylindrical member, a V-shaped groove on the outer surface of the restricted portion, opposite cylindrical end portions which have a diameter substantially equal to that of the first cylindrical member, and a pair of annular connecting portions which connect the end portions to the respective ends of the restricted portion. Further, a second body is formed from a second cylindrical member which has a diameter smaller than that of the first cylindrical member. The second body includes a cylindrical portion which has a diameter substantially equal to that of the second cylindrical member, a flange portion connected to the cylindrical portion and having a diameter larger than the inner diameter of one end portion of the first body, and an annular groove between the flange portion and the cylindrical portion. The flange portion includes an inclined surface along the periphery of the flange portion. The first and second bodies are assembled by fitting the flange portion of the second body into one of the end portions of the first body. A non-magnetic material is filled within the annular groove and a space between the inclined surface of the flange portion of the second body and the end portion of the first body. The outer end of the assembly is machined to provide a friction surface and to expose the non-magnetic material on the friction surface to form a rotor for an electromagnetic clutch.

9 Claims, 8 Drawing Sheets

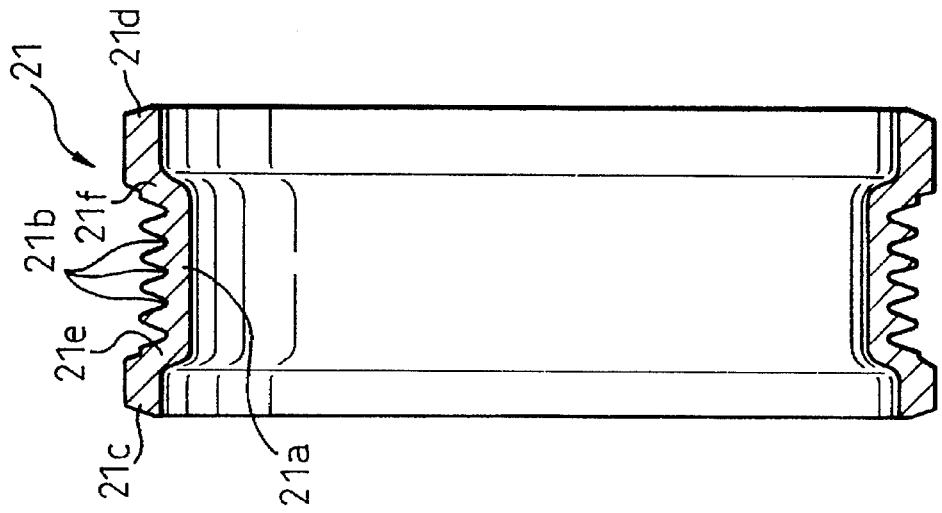
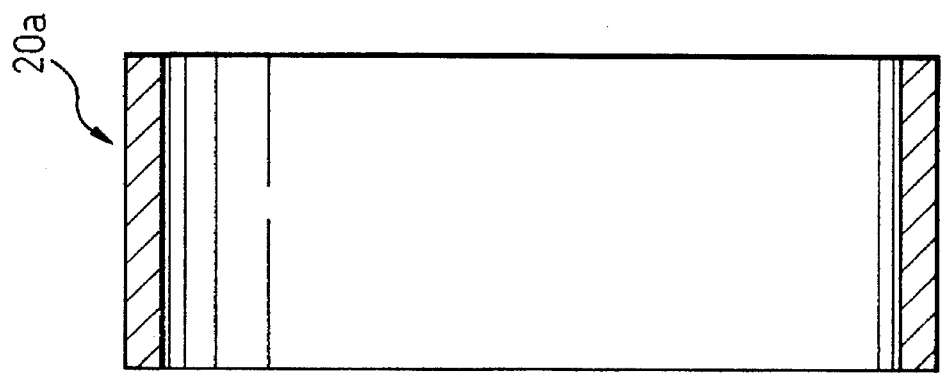

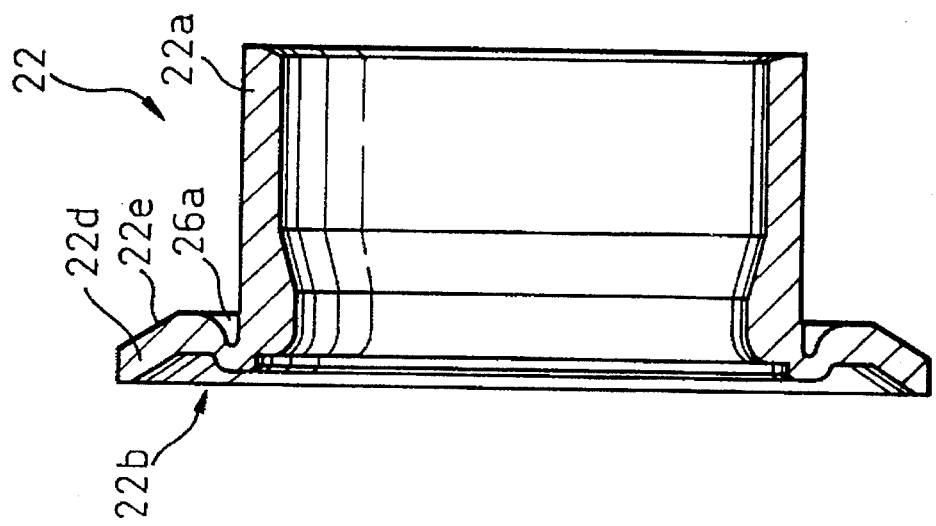
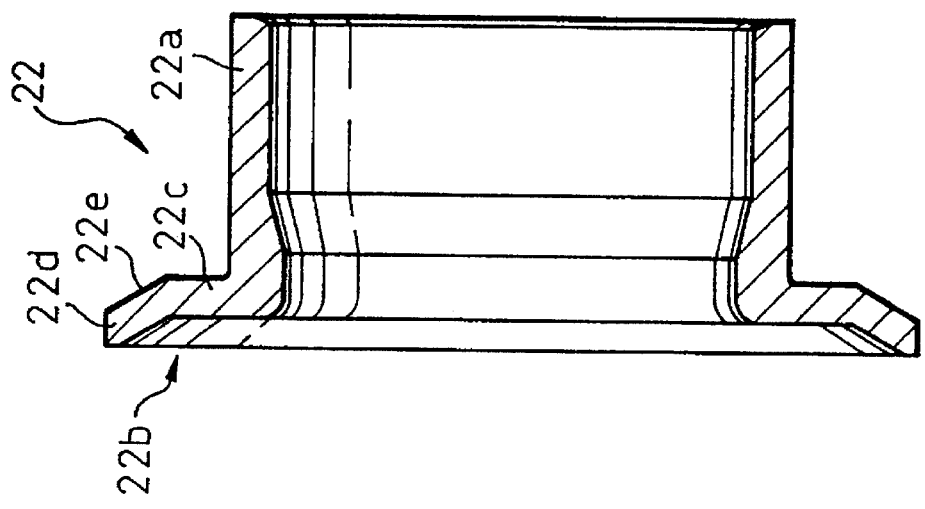
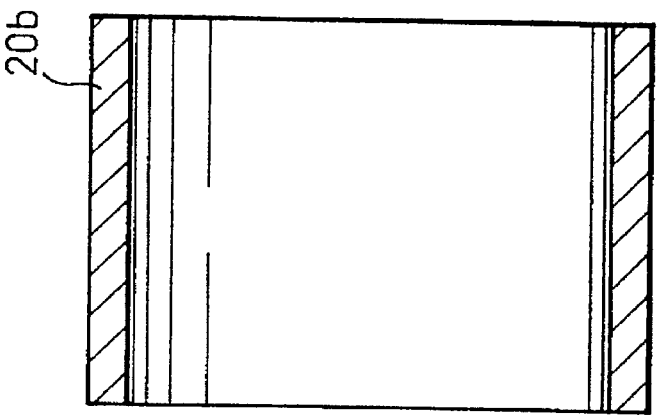

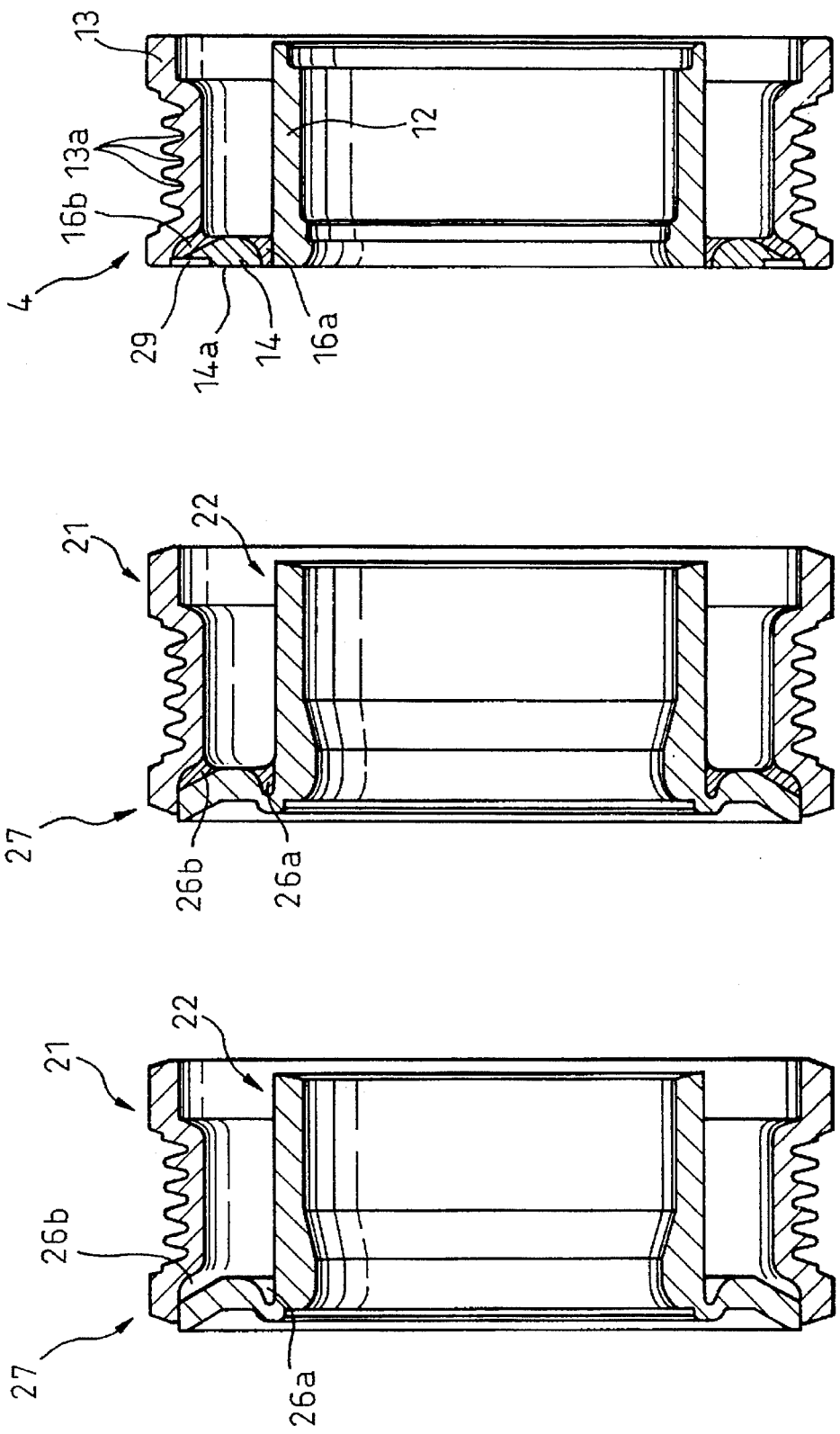

METHOD OF MANUFACTURING AN ELECTROMAGNETIC CLUTCH

BACKGROUND OF THE INVENTION (1) Field of the Invention

The invention relates to an electromagnetic clutch, and in particular, a method of producing a rotor for the clutch and a rotor produced by the method.

(2) Description of the Related Art

In FIG. 12, a prior art electromagnetic clutch 100 is illustrated. The electromagnetic clutch 100 is provided with an electromagnetic coil 101 in the form or a ring, a rotor 102 in the form of a double ring which encloses the electromagnetic coil 101, and an armature 103 which can axially move toward the rotor 102 when the coil 101 is energized. The rotor 102 includes inner and outer walls 107 and 108 and an end wall 105 connected to the inner and outer walls 107 and 108. The outer surface of the end wall 105 defines a friction surface with which the armature 103 engages when the coil 101 is energized.

The armature 102 includes slots 104, which are equally spaced along a circle, for magnetic shielding while the end wall 105 of the rotor 102 includes slots 106a and 106b for magnetic shielding. The slots 106a and 106b are equally spaced along two concentric circles in the end wall 105 of the rotor 102. The magnetic path is deformed as indicated by dotted line α1 by the slots 104, 106a and 106b to increase the magnetic attractive force by the coil 101.

The rotor 102 is formed by a one-piece body by cold forging, and the end wall 105 is slotted by press working to provide the slots 106a and 106b.

With reference to FIG. 13, there is shown another type of rotor 112 which comprises inner and outer walls 112 and 117 and an end wall 119. The end wall 119 is separately formed into a ring and connected to the inner and outer walls 117 and 118 by filling a non-magnetic material such as copper between the inner and outer walls 117 and 118 and the end wall 119 to provide magnetic-shielding portions 116a and 116b. Such a rotor is disclosed in, for example, Japanese Examined Patent Publication (Kokoku) No. 57-43768.

The above prior art rotors have the problems stated hereinafter. The rotor 102 of FIG. 12 has circumferential bridge portions between the slots 106a and between the slots 106b. The bridge portions allow the magnetic leakage which reduces the magnetic force between the rotor 102 and armature 103.

Furthermore, in the rotor 102, the area of the magnetic pole between the slots 106a and 106b is limited since the slots 106a and 106b and parallel to each other. The limited area of the magnetic pole limits the magnetic flux between the slots 106a and 106b and the magnetic attractive force between the rotor 102 and the armature 103, which limits the maximum transmitted force of the electromagnetic clutch 100. To solve this problem, it can be arranged that the slots are arranged in the end wall so as to diverge from each other tward the outside of the rotor by laser machining or other trimming machining method. However, such a machining increases the time and cost for production.

The rotor 112 of FIG. 13 does not include the bridge portions since the magnetic-shielding portions 116a and 116b are formed in concentric circles. However, the rotor 112 comprises the separate inner, outer and end walls 117, 118 and 119 which are connected by the magnetic-shielding portions 116a and 116b, which increases the number of the elements. Further, during the producing the rotor 112, it is difficult to precisely realize the alignment of the elements since. Thus, the production cost is increases.

SUMMARY OF THE INVENTION

The invention is directed to solve the above problems in the prior art.

The invention provides a method of producing a rotor for an electromagnetic clutch. According to the invention, a first body is formed from a first cylindrical member. The first body includes a restricted portion which extends circumferentially along the first body and has an inner diameter smaller than that of the first cylindrical member, a V-shaped groove on the outer surface of the restricted portion, opposite cylindrical end portions which have a diameter substantially equal to that of the first cylindrical member, and a pair of annular connecting portions which connect the end portions to the respective ends of the restricted portion. Further, a second body is formed from a second cylindrical member which has a diameter smaller than that of the first cylindrical member. The second body includes a cylindrical portion which has a diameter substantially equal to that of the second cylindrical member, a flange portion connected to the cylindrical portion and having a diameter larger than the inner diameter of one end portion of the first body, and an annular groove between the flange portion and the cylindrical portion. The flange portion includes an inclined surface along the periphery of the flange portion. The first and second bodies are assembled by fitting the flange portion of the second body into one of the end portions of the first body. A non-magnetic material is filled within the annular groove and a space between the inclined surface of the flange portion of the second body and the end portion of the first body. The outer end of the assembly is machined to provide an fraction surface and to expose the non-magnetic material on the friction surface.

According to the inventive method, the alignment of the inner end outer walls and the end wall, which is necessary in the prior art, is no longer necessary since the first and second bodies are assembled by fitting the flange portion of the second body into one of the end portion of the first body. This further reduces the number of the components and the production cost.

Preferably, the first and second bodies are formed by plastic working from the first and second cylinder members respectively.

Preferably, the non-magnetic material is selected from the group consisting of a copper alloy, a stainless steel, an aluminium alloy and a resin material.

According to another feature of the invention, there is provided an assembly of a half-finished rotor. The assembly comprises first and second bodies. The first body includes a main cylindrical portion, a V-shaped groove on the outer surface of the main cylindrical portion, opposite cylindrical end portions which have a diameter larger than that of the main cylindrical body, and a pair of annular connecting portions which connect the end portions to the respective ends of the cylindrical portion. The second body includes a main cylindrical portion, a flange portion connected to the main cylindrical portion and having a diameter larger than the inner diameter of one end portion of the first body, and an annular groove between the flange portion and the main cylindrical portion, the flange portion including an inclined surface along the periphery of the flange portion. The first and second bodies are assembled by fitting the flange portion of the second body into the one of the pair of the end portions of the first body to provide an annular space between the inclined surface of the first body and the inner surface of the end portion to which the flange portion is fitted.

BRIEF DESCRIPTION OF THE DRAWINGS

These and other objects and advantages and further description will now be discussed in connection with the drawings in which:

FIG. 3 is a section of a first cylindrical member and an illustration for explaining a method of producing a rotor according to the invention.

FIG. 4 is a section of a first body according to the invention.

FIG. 5A is a section of a second cylindrical member and an illustration for explaining a method of producing a rotor according to the invention.

FIG. 5B is a section of a second body according to the invention.

FIG. 6 is an illustration similar to FIG. 5 for explaining a step a forming an annular groove on the second body.

FIG. 7 is a section of an assembly of the first and second boies and an illustration for explaining the assembling thereof.

FIG. 8 is an illustration similar to FIG. 7 for explaining a step of forming non-magnetic portions in the assembly.

FIG. 9 is an illustration similar to FIG. 7 for explaining a step of removing the end of the assembly to provide a friction surface.

DESCRIPTION OF THE PREFERRED EMBODIMENTS

Figure 1:
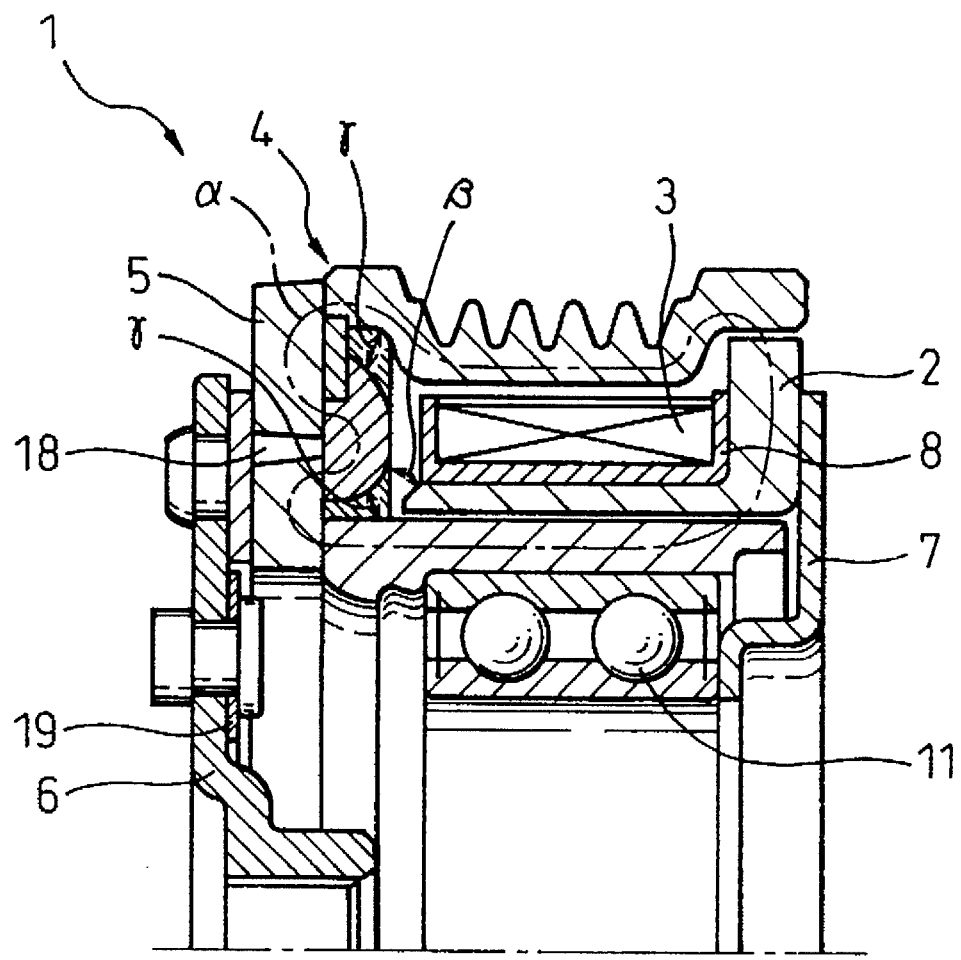
FIG. 1 is a section of a portion of an electromagnetic clutch which uses a rotor produced by a method according to the invention.

In FIG. 1, an electromagnetic clutch 1 is illustrated. The electromagnetic clutch 1 is adapted to transmit a rotational power from an automobile engine (not shown) to a refrigerating compressor (not shown) in an air conditioning system in an automobile.

The electromagnetic clutch comprises a rotor 4 according to the invention which is rotationally mounted to a housing of the compressor by a bearing 11, a stator member 2 which is mounted to the housing of the compressor through an annular stay 7, an electromagnetic coil 3 enclosed by the stator member 2, a rotating hub 6 connected to the shaft (not shown) of the compressor through a spline joint, and an armature 5 which is slidable along the axis of the electromagnetic clutch. The rotating hub 6 is connected to the armature 5 through a plurality of connecting members 19. The armature 5 is made, of ferromagnetic material, into a ring, and includes slots for magnetic shielding. The electromagnetic coil 3 comprises a copper wire with a nonconductive coat which is wound around a bobbin 8 of resin. The coil 3 is secured to the stator member 2 by a suitable adhesive.

Figure 2:
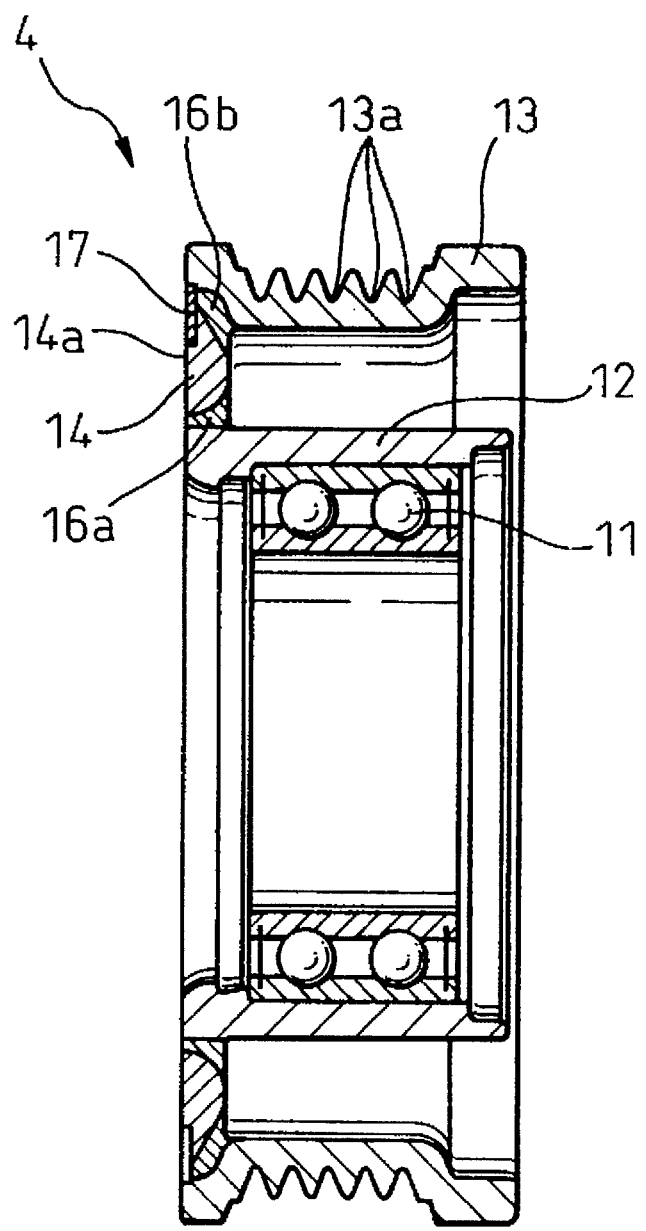
FIG. 2 is a section of a rotor produced by a method according to the invention.

With reference to FIG. 2, the rotor 4 comprise inner and outer walls 12 and 13 and an annular end wall 14 connected to the inner and outer walls 12 and 13. The inner surface of the inner wall 12 is finished to fit to the outer ring of the bearing 11. The outer wall 13 includes a plurality of V-grooves 13a on the outer surface for connecting to the automobile engine through V-belts (not shown). The outer surface of the 14a of the end wall 14 defines a friction surface to which the armature 5 contacts when the coil 3 is energized.

The end wall 14 faces the armature 5. When the coil 3 is energized, the armature 5 is moved to the end wall 14 by the magnetic attractive force and engages the friction surface of the end wall 14 to transmit the rotational power from the rotor 4 to the compressor through the rotating hub 6. The end wall 14 includes a friction increasing portion 17 and magnetic-shielding portions 15 and 16 between the inner wall 12 and the end wall 14, and the outer wall 13 and the end wall 14 respectively.. The magnetic-shielding portions 15 and 16, which are made of a magnetic-shielding material such as copper, extend the inner and outer periphery of the annular end wall. Thus, the magnetic circuit goes round the magnetic-shielding portions 15 and 16 to increase the magnetic force. In particular, the magnetic-shielding portions 15 and 16 axially diverge from each other toward outside of the rotor to increase the area of the magnetic pole. This further increases the magnetic force.

With reference to FIGS. 3–9, a method of producing the rotor 4 according to the invention will be described.

In the final step, a first cylindrical member 20a, which is made of low-carbon steel such as SPCC or SPHC, is provided (FIG. 3).

In the second step, the first cylindrical member 20a is formed into a first body 21 by plastic working, preferably press working as shown in FIG. 4. The first body 21 comprises a restricted portion 21a which has a diameter smaller than that of the first cylindrical member 20a, V-grooves 21b on the outer surface of the restricted portion 21a, opposite end portions 21c and 21d which have a diameter substantially equal to that of the first cylinder member 20a, and annular connecting portions 21e and 21f which connect the end portions 21c and 21d to the respective ends of the restricted portion 21a.

In the third step, a second cylindrical member 20b, which is made of low-carbon steel such as SPCC or SPHC, is provided (FIG. 5A). The second cylindrical member 20b has a diameter smaller than that of the first cylindrical member 10a.

In the fourth step, the cylindrical member 20b is formed into a second body 22 by plastic working, preferably cold forging as shown in FIG. 5B. The second body 22 comprises a cylindrical portion 22a which has a diameter substantially equal to that of the second cylindrical member 20b, a flange portion 22 which is integrally connected to one of the ends of the cylindrical portion 22a. The flange portion 22b includes an inner portion 22c which extends perpendicular to the outer surface of the cylindrical portion 22a and an outer portion 22d which is axially outwardly inclined to define an inclined surface 22e. The outer diameter of the outer portion 22d is larger than the inner diameter of one of the end portions 21c or 21d of the first body 21.

In the fifth step, the second body 22 is machined to provide an annular groove 26a between the cylindrical portion 22a and the flange portion 22b, as shown in FIG. 6, by plastic working and preferably by coining.

In the sixth step, the first and second bodies 21 and 22 are assembled to each other by fitting the outer portion 22d of the second body 22 into the one of the end portions 21c or 21 of the first body 21 as shown in FIG. 7. Thus, an assembly 27 of a half-finished rotor is provided according to the invention.

Figure 10:
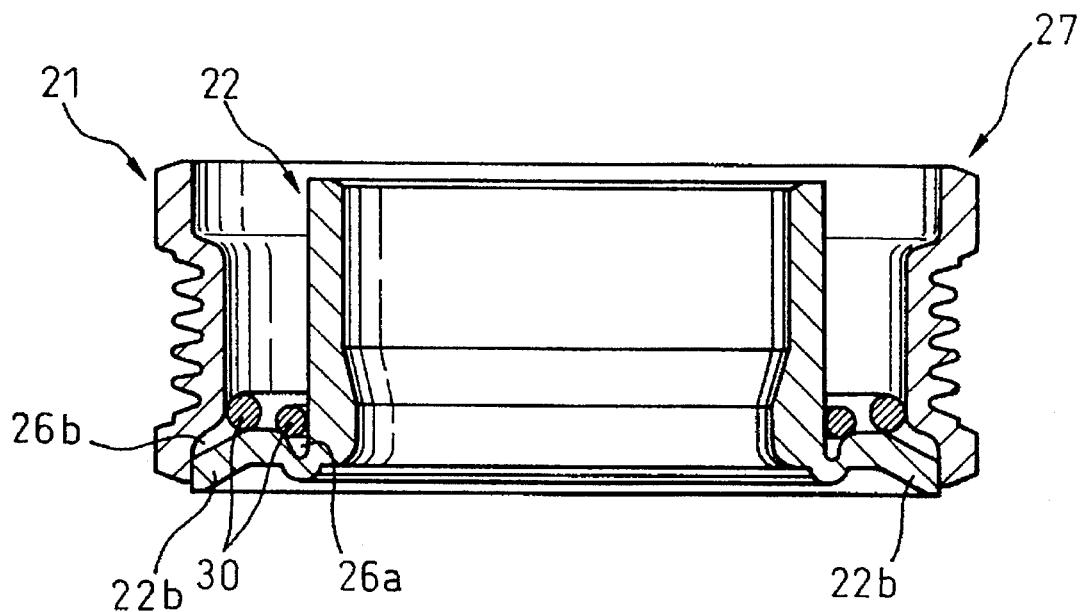
FIG. 10 is a section of the assembly and an illustration for explaining a step of applying a non-magnetic material to the assembly.

In the seventh step, a non-magnetic material such as copper or aluminium is filled into the groove 26a and a space 26b between the outer portion 22d of the second body 22 and the end portion 21c of the first body 21, in particular, between the inclined surface 22e and the surface of the connecting portion 21c as shown in FIG. 8. With reference to FIG. 10, the assembly 27 is positioned so that the flange portion 22b of the second body 22 is the bottom of the assembly 27.

Figure 11:
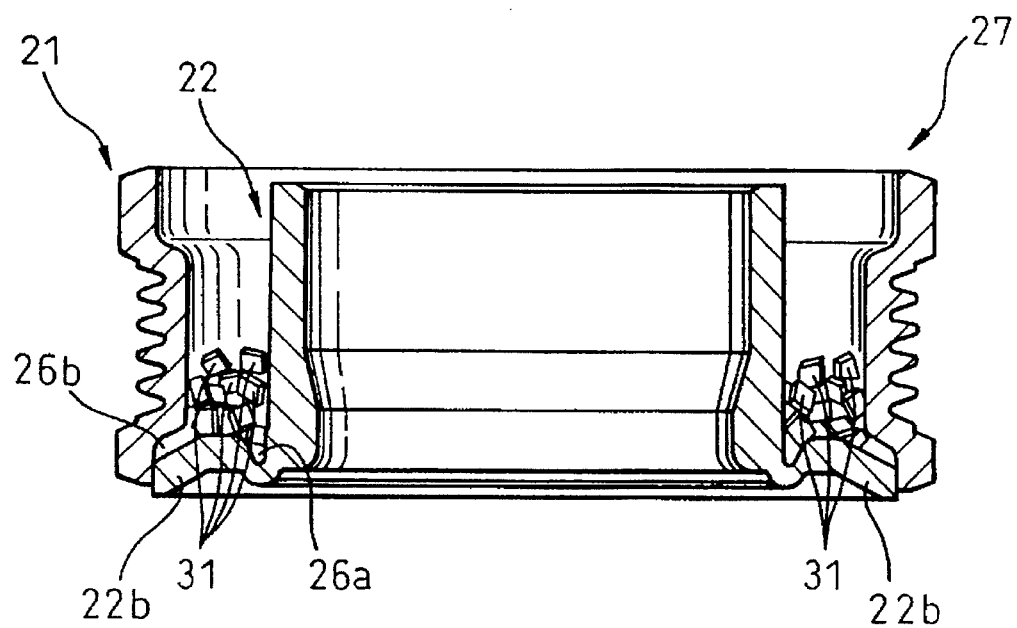
FIG. 11 is an illustration similar to FIG. 10 according to another embodiment of the invention.
Figure 12:
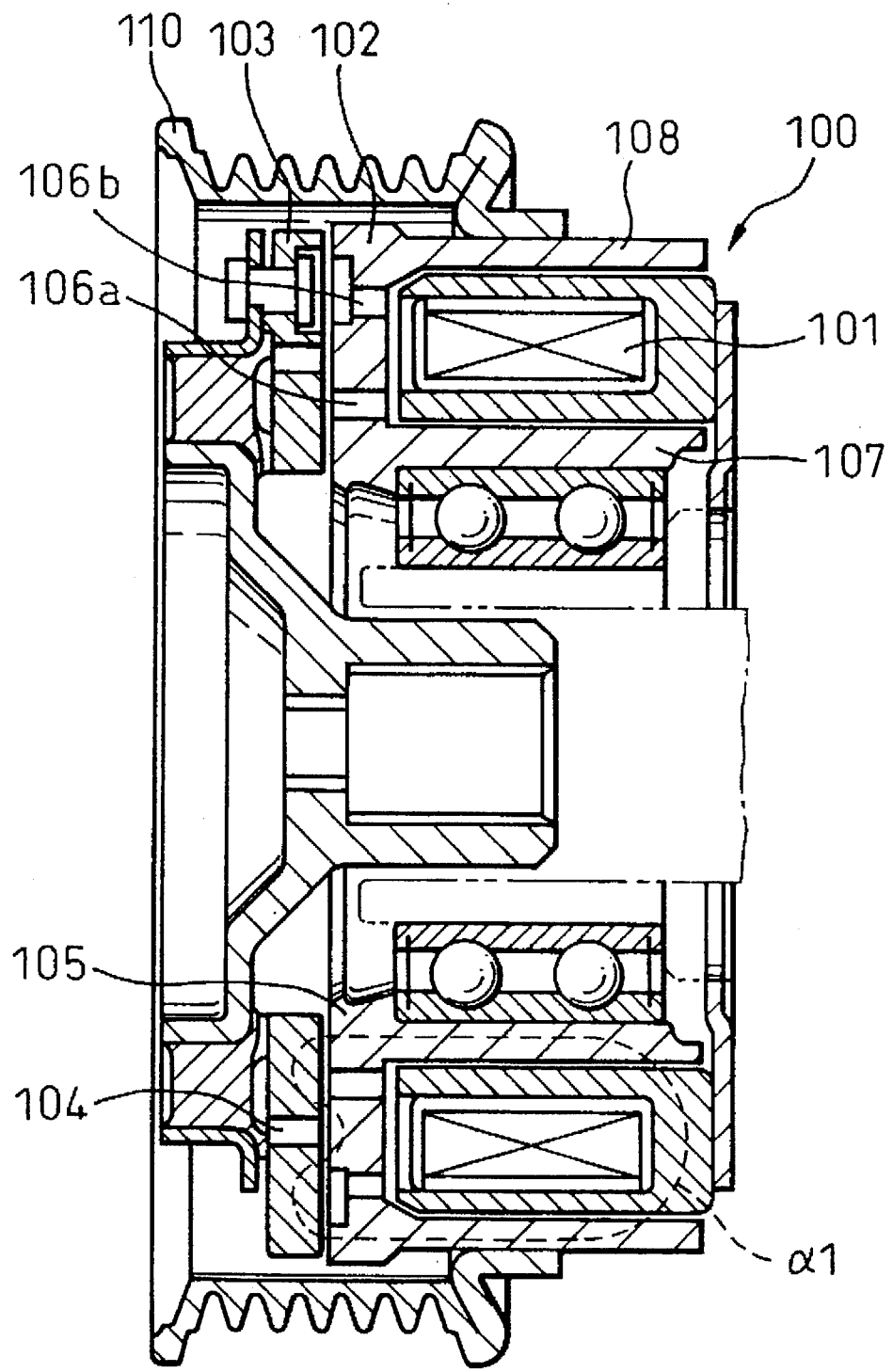
FIG. 12 is a section of an prior art electromagnetic clutch.
Figure 13:
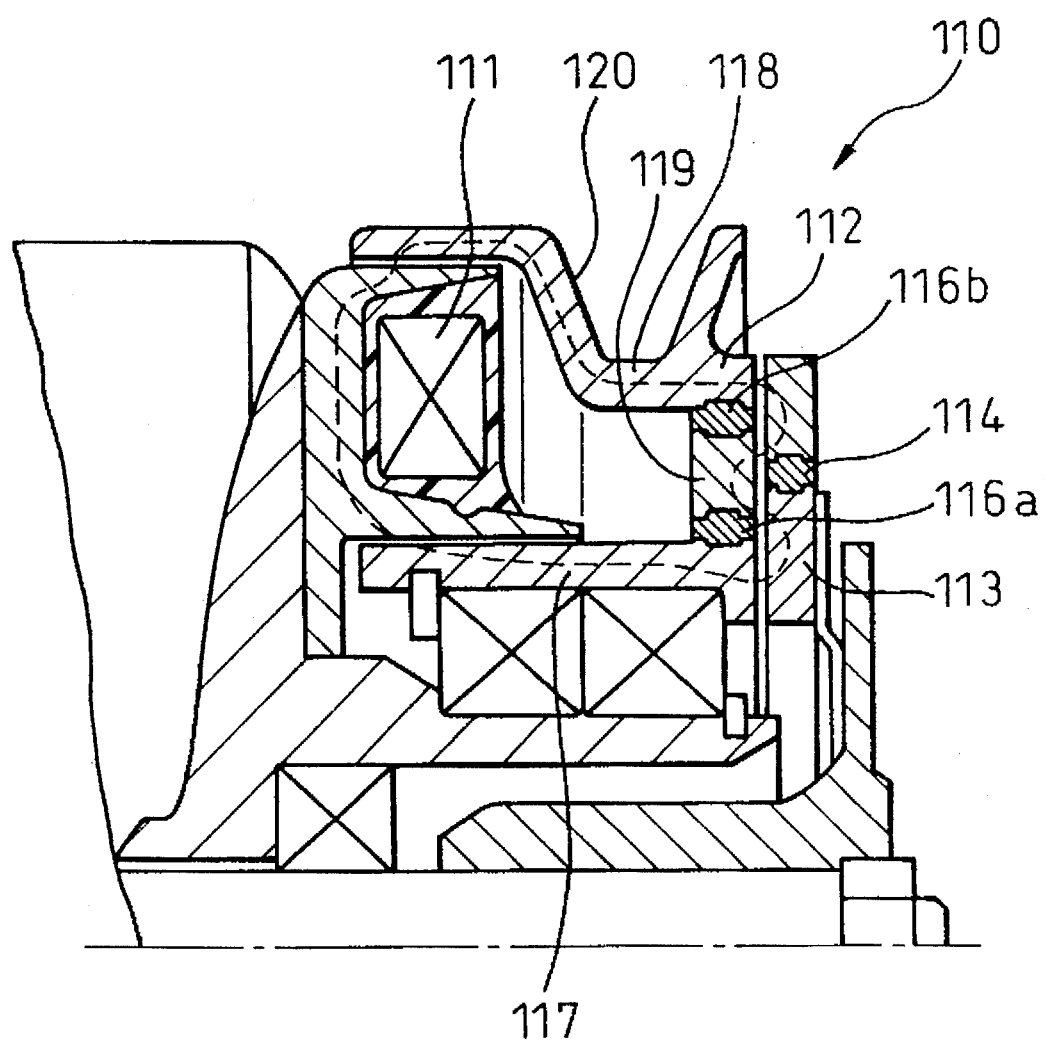
FIG. 13 is a partially enlarged section of an prior art electromagnetic clutch.

At least one ring 30 of the non-magnetic material, which has a melting point lower than that of the assembled body 27, is provided on the bottom. The non-magnetic material in the form of a dispersion 31 such as powder and particles can be used (FIG. 11).

After this, the assembly 27 and the ring 30 of the non-magnetic material are heated to the melting point of the ring 30 by a suitable heating device. When, for example, a bronze material, which contains copper of 95% and tin of 5%, is used the assembly 27 is heated up to about 1080° C. The non-magnetic material can be melted by TIG welding or MIG welding. Further, a stainless steel can be used as a non-magnetic material. In this case, the non-magnetic material of stainless steel can be applied by a friction welding method. The melted non-magnetic material flows into the groove 26a and the space 26b.

After heating, a cooling process for setting the melting non-magnetic material is carried out in vacuum or in a non-activating gas, for example nitrogen gas to prevent oxidation of the assembly 27 and the non-magnetic material. When the non-magnetic material in the groove 26a and the space 26b are set, the assembly 27 and the non-magnetic material are rigidly connected by diffusion bonding. Thus, a half-finished rotor 28 is provided.

In the last step, the half-finished rotor 28 is machined to remove the end portion so that the filled non-magnetic material are exposed to provide magnetic-shielding portions 16a and 16b. Further, on the machined surface, an annular groove 19 is provided into which the friction plate 17 is positioned.

The rotor 4 produced by the method of the invention includes the magnetic-shielding portions 16a and 16b which axially outwardly diverge to maximize the area of magnetic pole and the magnetic flux. This allows the electromagnetic clutch 1 with the rotor 4 to transmit increased torque.

The rotor 4 does not include the bridge portions which appears in the prior art rotor. Therefore, the magnetic leakage is reduced compared with the prior art rotor.

In the prior art rotor, in which the slots for the magnetic shielding are made by blanking, the radial dimension between the inner and outer slots must be necessary at least 0.6 times of the thickness of the end wall of the rotor. In the rotor produced by the inventive method, the radial dimension between the inner and outer magnetic-shielding portions 16a and 16b can be reduced to 0.3 times of the thickness of the end wall 14 since they are not made by blanking. This allows the rotor 4 to have a reduced diameter. Further, in the electromagnetic clutch 1 with the inventive rotor 4, a separate pulley is no longer necessary since the V-groove 13a are formed integrally on the outer surface of the outer wall 13, which allows the electromagnetic clutch 1 to have a reduced outer diameter. Thus, the deduced diameter of the electromagnetic clutch 1 increases the rotational speed, which increases the displacement of the compressor connected to the electromagnetic clutch 1.

According to the invention, the mean thickness γ of the respective magnetic-shielding portions 16a and 16b can be larger than that of the prior art rotor, which reduces the magnetic leakage. Further, the distance β between the end wall 14 and the stator 2 can be smaller than that of the prior art rotor. Thus, the magnetic leakage is reduced.

It will be understood by those skilled in the art that the forgoing description is a preferred embodiment of the disclosed device and that various changes and modifications may be made without departing from the spirit and scope of the invention.

We claim:

1. A method of producing a rotor for an electromagnetic clutch comprising the steps of:
   (a) providing a first cylindrical member;
   (b) forming the first cylindrical member into a first body including a restricted portion which extends circumferentially along the first body and has an inner diameter smaller than that of the first cylindrical member, a V-shaped groove on the outer surface of the restricted portion, opposite cylindrical end portions which have a diameter substantially equal to that of the first cylindrical member, and a pair of annular connecting portions which connect the end portions to the respective ends of the restricted portion;
   (c) providing a second cylindrical member which has a diameter smaller than that of the first cylindrical member;
   (d) forming the second cylindrical member into a second body which comprises a cylindrical portion which has a diameter substantially equal to that of the second cylindrical member, a flange portion connected to the cylindrical portion and having a diameter larger than the inner diameter of one end portion of the first body, and an annular groove between the flange portion and the cylindrical portion, the flange portion including an inclined surface along the periphery of the flange portion;
   (e) assembling the first and second bodies by fitting the flange portion of the second body into one of the end portions of the first body;
   (f) filling a non-magnetic material within the annular groove and a space between the inclined surface of the flange portion of the second body and the end portion of the first body; and
   (g) machining the outer end of the assembled first and second bodies where the flange portion is fitted into the end portion of the first body to provide an friction surface and to expose the non-magnetic material on the friction surface.

2. A method of producing a rotor according to claim 1 in which the first body is formed by plastic working from the first cylinder member.

3. A method of producing a rotor according to claim 1 in which the second body is formed by plastic working from the second cylinder member.

4. A method of producing a rotor according to claim 1 in which the non-magnetic material is selected from the group consisting of a copper alloy, a stainless steel, an aluminium alloy and a resin material.

5. A method of producing a rotor according to claim 1 in which the inclined surface of the flange portion of the second body is formed by bending the circumferential portion of the flange portion.

6. A method of producing a rotor according to claim 1 in which step (f) comprises the steps of:

(h) placing the assembled body with the flange portion at the bottom;

(i) providing a non-magnetic material in the form of a ring on the flange portion;

(j) melting the non-magnetic material;

(k) cooling the melted non-magnetic material to set the melted non-magnetic material.

7. A method of producing a rotor according to claim 1 in which step (f) comprises the steps of:

(l) placing the assembled body with the flange portion at the bottom;

(m) providing a non-magnetic material in the form of small pieces or powder on the flange portion;

(n) melting the non-magnetic material;

(o) cooling the melted non-magnetic material to set the melted non-magnetic material.

8. A method of producing a rotor according to claim 1 further comprising the steps of:

(p) machining the friction surface to provide a recess; and (q) putting a friction material into the recess.

9. A method of producing a rotor according to claim 1 further comprising the step of:

(r) machining the inner surface of the cylindrical portion of the second body for fitting a bearing.

* * * * *